United States Patent
Newberg et al.

(10) Patent No.: US 9,655,147 B2
(45) Date of Patent: *May 16, 2017

(54) METHOD AND APPARATUS FOR BEARER CONTROL IN A GROUP CALL

(71) Applicant: MOTOROLA SOLUTIONS, INC, Schaumburg, IL (US)

(72) Inventors: Donald G Newberg, Hoffman Estate, IL (US); Peter M Drozt, Prairie Grove, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 50 days.

This patent is subject to a terminal disclaimer.

(21) Appl. No.: 14/132,416

(22) Filed: Dec. 18, 2013

(65) Prior Publication Data

US 2015/0173106 A1 Jun. 18, 2015

(51) Int. Cl.
*H04M 3/42* (2006.01)
*H04W 76/00* (2009.01)
(Continued)

(52) U.S. Cl.
CPC ..... *H04W 76/005* (2013.01); *H04W 72/0413* (2013.01); *H04W 76/066* (2013.01);
(Continued)

(58) Field of Classification Search
CPC ... H04L 29/08108; H04M 3/56; H04W 72/04; H04W 24/00
(Continued)

(56) References Cited

U.S. PATENT DOCUMENTS

| 8,355,413 B2 | 1/2013 | Vasamsetti et al. |
| 8,422,448 B2 | 4/2013 | Chu et al. |

(Continued)

FOREIGN PATENT DOCUMENTS

| WO | 2009/109803 A1 | 11/2009 |
| WO | 2011081590 A1 | 7/2011 |

(Continued)

OTHER PUBLICATIONS

Doumi T. et al., "LTE for public safety networks," IEEE Communications Magazine, IEEE Service Center, Piscataway, US, vol. 51, No. 2, Feb. 2, 2013, pp. 106-112.

(Continued)

*Primary Examiner* — Anthony Addy
*Assistant Examiner* — Matthew Genack (57) ABSTRACT

A method and service network element are provided that control a distribution of multiple uplink bearers among multiple user devices participating in a group call. In response to receiving a trigger to reevaluate the multiple uplink bearers, one or more user devices of the multiple user devices are identified as candidates for de-allocation of uplink bearers based on a profile associated with each of the multiple user devices. Further, based on the profiles associated with each of the multiple user devices, one or more of the multiple user devices are identified as candidates for establishment of an uplink bearer. An uplink bearer, of the multiple uplink bearers, then is released from one or more of the user devices identified as candidates for de-allocation of uplink bearers, and an uplink bearer is established for one or more user devices identified as candidates for establishment of uplink bearers.

13 Claims, 5 Drawing Sheets

(51) Int. Cl.
*H04W 72/04* (2009.01)
*H04W 76/06* (2009.01)
*H04W 4/06* (2009.01)
*H04W 4/22* (2009.01)

(52) U.S. Cl.
CPC ............... *H04W 4/06* (2013.01); *H04W 4/22* (2013.01); *H04W 76/007* (2013.01)

(58) Field of Classification Search
USPC ........................ 455/414.1, 416, 450, 452.1
See application file for complete search history.

(56) References Cited

U.S. PATENT DOCUMENTS

| | | | |
|---|---|---|---|
| 2003/0223381 A1* | 12/2003 | Schroderus | H04L 12/1868 370/285 |
| 2007/0049314 A1* | 3/2007 | Balachandran et al. | 455/518 |
| 2009/0215409 A1* | 8/2009 | Cai | H04W 76/005 455/90.2 |
| 2010/0085419 A1* | 4/2010 | Goyal | H04N 7/147 348/14.09 |
| 2010/0250688 A1 | 9/2010 | Sachs et al. | |
| 2011/0149011 A1* | 6/2011 | Kim | G09B 5/06 348/14.03 |
| 2012/0026880 A1 | 2/2012 | Miller et al. | |
| 2012/0250509 A1 | 10/2012 | Leung et al. | |
| 2013/0042011 A1 | 2/2013 | Sugizaki et al. | |
| 2013/0136036 A1 | 5/2013 | Chen et al. | |
| 2013/0159521 A1* | 6/2013 | Marocchi et al. | 709/225 |
| 2014/0064210 A1 | 3/2014 | Anchan et al. | |
| 2015/0092542 A1 | 4/2015 | Yang et al. | |
| 2015/0173107 A1 | 6/2015 | Newberg et al. | |

FOREIGN PATENT DOCUMENTS

| | | |
|---|---|---|
| WO | WO2012150882 A1 | 11/2012 |
| WO | 2014/036339 A2 | 3/2014 |

OTHER PUBLICATIONS

International Search Report and Written Opinion for corresponding International Patent Application No. PCT/US2014/070843, mailed on Jun. 2, 2015.
Non-Final Office Action mailed Aug. 20, 2015, in U.S. Appl. No. 14/132,472, Newberg, D.G. et al., filed Dec. 18, 2013.
Notice of Allowance mailed Jan. 29, 2016, in U.S. Appl. No. 14/132,472, Newberg, D.G. et al., filed Dec. 18, 2013.
Notice of Allowance mailed Mar. 8, 2016, in U.S. Appl. No. 14/132,472, Newberg, D.G. et al., filed Dec. 18, 2013.
The PCT Search Report and the Written Opinion, PCT/US2014/070838, filed Dec. 17, 2014, mailed Jun. 2, 2015, all pages.

\* cited by examiner

FIG. 7B

METHOD AND APPARATUS FOR BEARER CONTROL IN A GROUP CALL

CROSS-REFERENCE TO RELATED APPLICATIONS

This application is related to U.S. patent application Ser. No. PCT/US14/70843, filed on the same date as this application, which application is assigned to Motorola Solutions, Inc., and which application is hereby incorporated herein in its entirety.

FIELD OF THE INVENTION

The present invention relates generally to wireless communication systems, and, in particular, to group call bearer control in a wireless communication system.

BACKGROUND OF THE INVENTION

In order to provide mission critical Push-to-Talk (PTT) group calls in a 3GPP LTE (Third Generation Partnership Project Long Term Evolution) communication system, it is desirable that wireless resources be guaranteed so that such resources are always available when needed. However, this can be an issue when a large number of emergency responders are at a same location, for example, an incident scene, resulting in available bandwidth that is insufficient to provide all of the emergency responders with a bearer. For downlink communications, such bandwidth constraints can be resolved through the use of broadcast, for example, and LTE eMBMS (Evolved Multimedia Broadcast Multicast Service) service. However, for uplink communications, there is no way to share a single uplink bearer among the members of the group. If every user who is a group member is assigned an uplink bearer, this can block other important uplink traffic due to a lack of available resources for such other traffic, even if most of the users do not transmit.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION OF THE INVENTION

To address the need for uplink bearer allocation in a group call, a method and service network element are provided that control a distribution of multiple uplink bearers among multiple user devices participating in a group call. In response to receiving a trigger to reevaluate the multiple uplink bearers, one or more user devices of the multiple user devices are identified as candidates for de-allocation of uplink bearers based on a profile associated with each of the multiple user devices. Further, based on the profiles associated with each of the multiple user devices, one or more of the multiple user devices are identified as candidates for establishment of an uplink bearer. An uplink bearer, of the multiple uplink bearers, then is released from one or more of the user devices identified as candidates for de-allocation of uplink bearers, and an uplink bearer is established for one or more user devices identified as candidates for establishment of uplink bearers.

Generally, an embodiment of the present invention encompasses a method for bearer control in a wireless communication system. The method includes receiving a trigger to reevaluate a plurality of uplink bearers needed for a group call; identifying, based on a profile associated with each user device of a plurality of user devices participating in the group call, one or more participating user devices of the plurality of participating user devices as candidates for de-allocation of uplink bearers; identifying, based on a profile associated with each participating user device of the plurality of participating user devices, one or more participating user devices of the plurality of participating user devices as candidates for establishment of an uplink bearer; releasing an uplink bearer, of the plurality of uplink bearers, from one or more participating user devices of the plurality of participating user devices identified as candidates for de-allocation of uplink bearers; and establishing an uplink bearer for one or more participating user devices of the plurality of participating user devices identified as candidates for establishment of uplink bearers.

Another embodiment of the present invention encompasses a service network element that includes processor that is configured to receive a trigger to reevaluate a plurality of uplink bearers needed for a group call; identify, based on a profile associated with each user device of a plurality of user devices participating in the group call, one or more participating user devices of the plurality of participating user devices as candidates for de-allocation of uplink bearers; identify, based on a profile associated with each participating user device of the plurality of participating user devices, one or more participating user devices of the plurality of participating user devices as candidates for establishment of an uplink bearer; release an uplink bearer, of the plurality of uplink bearers, from one or more participating user devices of the plurality of participating user devices identified as candidates for de-allocation of uplink bearers; and establish an uplink bearer for one or more participating user devices of the plurality of participating user devices identified as candidates for establishment of uplink bearers.

Figure 1:
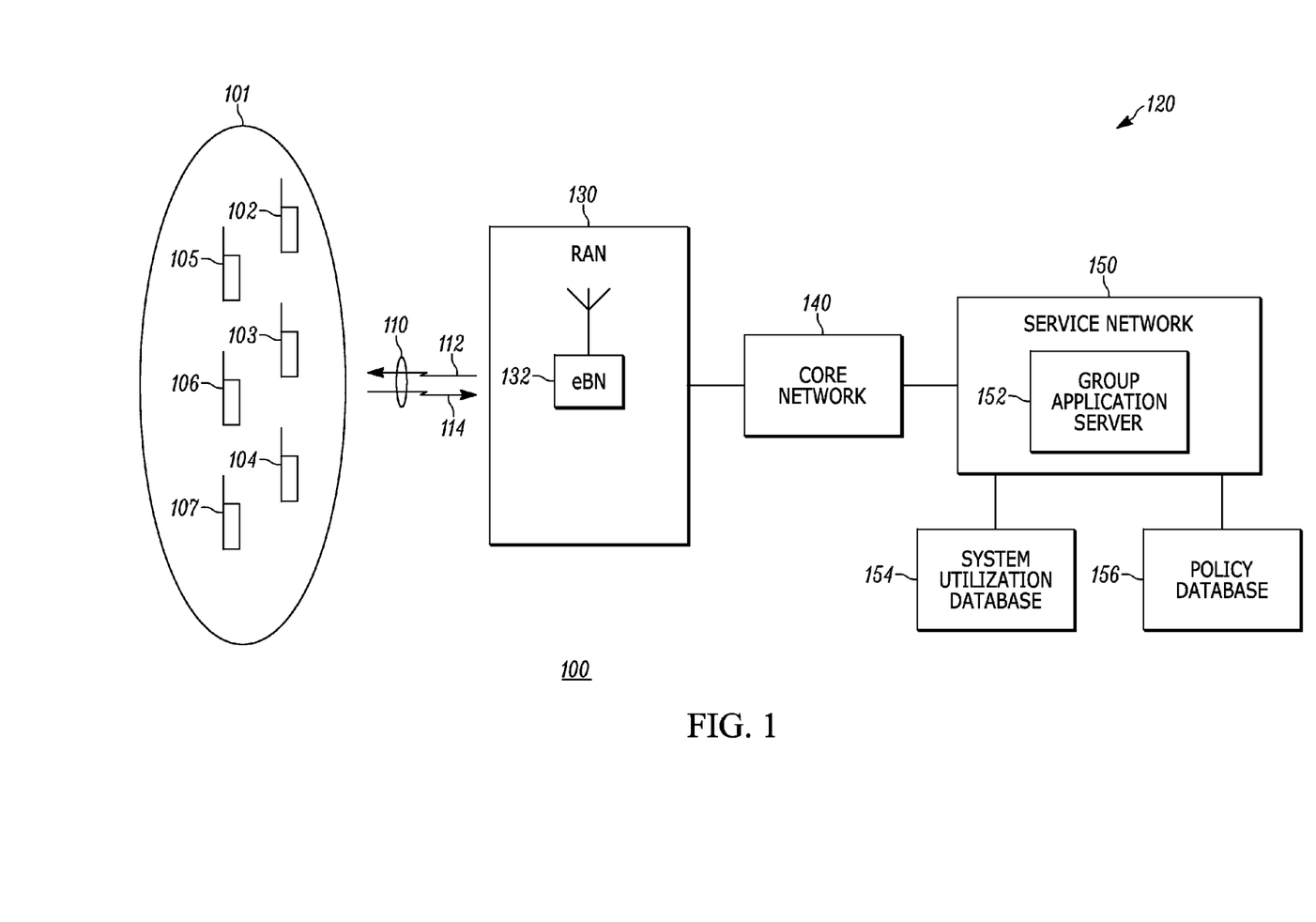
FIG. 1 is a block diagram of a wireless communication system in accordance with an embodiment of the present invention.

The present invention may be more fully described with reference to FIGS. 1-7B. FIG. 1 is a block diagram of a wireless communication system 100 in accordance with an embodiment of the present invention. Communication system 100 includes multiple user devices 102-107 (six shown), such as but not limited to a cellular telephone, a radio telephone, a personal digital assistant (PDA), laptop computer, or personal computer with radio frequency (RF) capabilities, or a wireless modem that provides RF access to digital terminal equipment (DTE) such as a laptop computer. In various technologies, user devices 102-107 may be referred to as a mobile station (MS), user equipment (UE), user terminal (UT), subscriber station (SS), subscriber unit (SU), remote unit (RU), access terminal, and so on. The users of the multiple user devices 102-107 are all members of a same talk group, which talkgroup may be pre-determined or may be dynamically determined, for example, as the users arrive at an incident scene, and correspondingly the multiple user devices 102-107 are all part of a same group call.

Communication system 100 further includes a radio access network (RAN) 130 in communication with a core network 140, such as an Evolved Packet Core (EPC) of a 3GPP LTE (Third Generation Partnership Project Long Term Evolution) communication system. Access network 130 includes one or more wireless access nodes 132 (one shown) that each provides wireless communication services to user devices residing in a coverage area of the access node via a corresponding air interface, such as user devices 102-107 and air interface 110 with respect to access node 132. Preferably, wireless access node 132 is an eNodeB; however, wireless access node 132 may be any network-based wireless access node, such as an access point (AP) or base station (BS). Access network 132 also may include one or more access network controllers (not shown), such as a Radio Network Controller (RNC) or a Base Station Controller (BSC), coupled to the one or more wireless access nodes; however, in various embodiments of the present invention, the functionality of such an access network controller may be implemented in the access node. As is known in the art, core network 140 may include, among other core network elements, a Mobility Management Entity (MME), multiple gateways, such as a Serving Gateway and a Public Data Network Gateway (PDN GW), a Policy Control and Charging Rules Function (PCRF), and a Home Subscriber Server (HSS).

Core network 140 further is coupled to a service network 150 that is hierarchically above the core network. Service network 150 includes one or more Application Servers (ASs) or other services network elements 152 (one shown) implementing an Application Function (AF), such as a Group Application Server, for example, a Push-to-Talk (PTT) Server. Each service network element 152 has a bearer connection and a signaling connection with core network 140, for example, in a 3GPP LTE communication system, each AF may have a connection with the PDN GW of the core network to convey user data and a connection with the PCRF of the core network to convey control data.

Further, each service network element 152 can access each of a system utilization database 154 and a policy database 156. System utilization database 154 maintains information concerning a utilization of system resources, such as an availability of wireless resources, that is, an available channel capacity, at each access node 132 of access network 130, an availability of backhaul paths from each such access node to the service network element 152, and a length of time (consecutive and/or non-consecutive) that each user device 102-107 utilizes service network 150, for example, how much time each user device consumes transmitting, for example, audio, on an uplink bearer. For example, each access node 132 may periodically update system utilization database 154 with its channel capacity or the access node may update the system utilization database in response to a request from an element implementing the system utilization database. In various embodiments of the present invention, system utilization database 154 may be an independent network element or may reside in, or be distributed among, any of an element of access network 130, such as access node 132, an element of core network 140, such as an MME, or an element of service network 150.

Policy database 156 maintains policy rules for making policy decisions regarding active user devices, such as available services and applications and priorities associated with each such service or application or priorities of the users, such as a quality of service (QoS) level required or acceptable for a service data flow associated with such a service or application (as a higher QoS typically indicates a higher priority service or application). In various embodiments of the present invention, policy database 156, too, may be an independent network element or may reside in any of an element of core network 140, such as a PCRF, or an element 152 of service network 150, such as a Group Application Server.

Together, each of the elements of access network 130, such as access node 132, the elements of core network 140, the elements of service network 150, system utilization database 154, and user policy database 156 may be referred to as an infrastructure 120 of communication system 100 and, correspondingly, each of access node 132, the elements of core network 140, service network element 152, system utilization database 154, and policy database 156 may be referred to as an infrastructure element.

Air interface 110 comprises multiple downlink bearers 112 and multiple uplink bearers 114. The multiple uplink bearers 114 include multiple unicast uplink bearers and the multiple downlink bearers 112 includes multiple downlink unicast bearers and one or more broadcast or multicast bearers. As used herein, a 'bearer' refers to a data transmission path (that is, a 'bearer' as used herein is used to convey media) whose endpoints are an element of service network 150, such as Group Application Server 152, and a user device, such as user devices 102-107. Thus, a unicast uplink bearer has a wireless path, from a user device to an access node, and a network transport path, from the access node to the service network element. While different unicast uplink bearers may share a common network transport path through infrastructure 120 to an element of service network 150, they are unicast uplink bearers in the sense that they are Point-to-Point (PTP), that is, they employ a unicast channel in uplink 114 and have, as a user endpoint, a single user device. Further, the unicast uplink bearers are dedicated bearers, as they cannot be shared between user devices.

Figure 2:
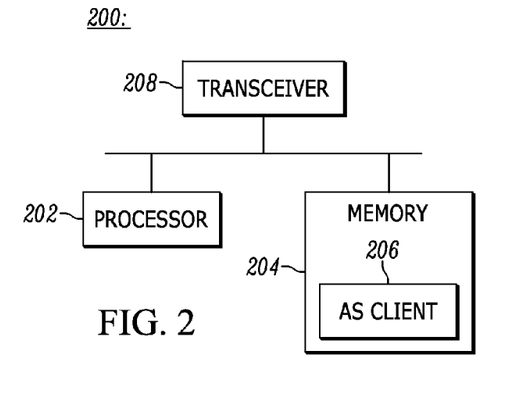
FIG. 2 is a block diagram of a user device of the communication system of FIG. 1 in accordance with an embodiment of the present invention.
Figure 3:
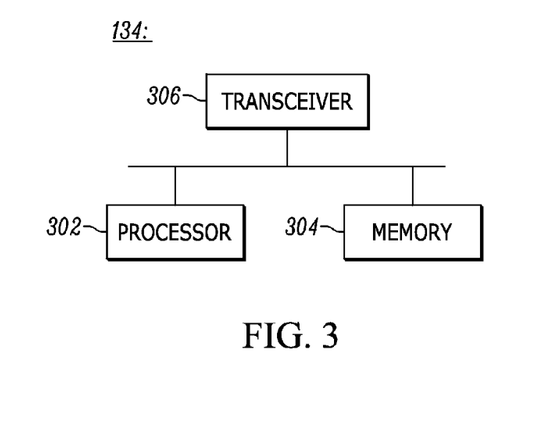
FIG. 3 is a block diagram of an access node of the communication system of FIG. 1 in accordance with an embodiment of the present invention.
Figure 4:
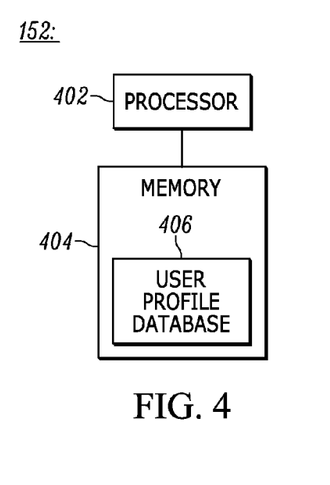
FIG. 4 is a block diagram of a service network element of the communication system of FIG. 1 in accordance with an embodiment of the present invention.

Referring now to FIGS. 2-4, block diagrams are provided of a user device 200, such as user devices 102-107, an access node 132, and a service network element 152, such as a Group Application Server, in accordance with embodiments of the present invention. Each of user device 200, access node 132, and service network element 152 includes a respective processor 202, 302, 402, such as one or more microprocessors, microcontrollers, digital signal processors (DSPs), combinations thereof or such other devices known to those having ordinary skill in the art. The particular operations/functions of processors 202, 302, and 402, and thus of user device 200, access node 132, and service network element 152 is determined by an execution of software instructions and routines that are stored in a respective at least one memory device 204, 304, 404 associated with the processor, such as random access memory (RAM), dynamic random access memory (DRAM), and/or read only memory (ROM) or equivalents thereof, that store data and programs that may be executed by the corresponding processor and that allows the user device, access node, and service network element to perform all functions necessary to operate in communication system 100. Each of user device 200 and access node 132 further includes a respective radio frequency (RF) transceiver 208, 306 for exchanging RF messaging between the user device and the access node over an intervening air interface.

The at least one memory device 204 of user device 200 further maintains one or more application layer clients 206 (one shown) that, when executed by processor 202, communicates with a corresponding application executed by an Application Function (AF), such as Group Application Server 152. For example, the one or more application layer clients 206 may include a Push-to-Talk (PTT) client that would communicate with Group Application Server 152.

In addition, one or more of the at least one memory device 404 of service network element 152 further includes a user profile database 406 that maintains a profile associated with a user of each user device that is a member of the communication groups served by the service network element, such as communication group 101 and user devices 102-107. In various embodiments of the present invention, parameters stored in a profile may be pre-provisioned in the service network element, may be provided to the service network element by a user device when the user device activates in communication system 100, and/or may be retrieved by the service network element from elements of infrastructure 120. The parameters maintained in a user's profile may include a location of the user, such as an access node or a cell serving a user device associated with the user, an identifier of each communication group of which the user is a member, such as communication group 101 with respect to users associated with user devices 102-107, a time period that has expired since a user device associated with the user has most recently transmitted on an uplink bearer, a role of the user, such as an employment area, title, or responsibility, associated with the user device, a relationship between the user and one or more other members of a communication group that includes the user, such as communication device 101 with respect to user devices 102-107, and any other prioritization of the user and/or user's device over another user/user device. In other embodiments of the present invention, the parameters stored in user profile database 406 may instead, or in addition, be stored in policy database 156.

For example, the service network element may retrieve mobility information associated with a user device, such as a location of the user device, from a location and mobility database of communication system 100, such as a Home Subscriber Server (HSS), a Home location Register (HLR), a Visited Location Register (VLR), or an application level location service. For example, the service network element may query a PCRF of core network 140 for the identity of an access node and cell serving a user device. In response to receiving the query, the PCRF may retrieve, from an HSS, an identifier of a cell, such as a Physical Cell Identifier (PCI), a Target Cell Identifier (TCI), and a E-UTRAN Cell Global Identifier (ECGI), which serves the user device and provide the retrieved cell identifier to the service network element.

The embodiments of the present invention preferably are implemented within user devices 102-107, access node 132, and service network element 152, and more particularly with or in software programs and instructions stored in the respective at least one memory device 204, 304, and 404, and executed by respective processors 202, 302, and 402, associated with the of the user device, access node, and service network element. However, one of ordinary skill in the art realizes that the embodiments of the present invention alternatively may be implemented in hardware, for example, integrated circuits (ICs), application specific integrated circuits (ASICs), and the like, such as ASICs implemented in one or more of user devices 102-107, access node 132, and service network element 152. Based on the present disclosure, one skilled in the art will be readily capable of producing and implementing such software and/or hardware without undo experimentation.

Communication system 100 comprises a wireless communication system that employs an evolved Multimedia Broadcast Multicast Service (eMBMS) scheme for group calls. Preferably, communication system 100 is a Third Generation Partnership Project (3GPP) Long Term Evolution (LTE) communication system. However, communication system 100 may operate in accordance with any wireless telecommunication system employing an eMBMS scheme and wherein there are a limited number of uplink bearers available for allocation to members of a communication group at any given time, such as communication group 101 and user devices 102-107.

In the prior art, uplink bearers may be reserved for all group members arriving at an incident scene, resulting in a potential lack of bearers for allocation to later arriving group members, or to other later arriving groups, and a rejection of bearer requests associated with the late arrivers, regardless of a priority of such requests. Or, bearers may be allocated to group members on an 'as needed,' or first come first serve, basis and when no more bearers are available for allocation, subsequent bearer requests associated with group members, or with other groups, will be rejected, again regardless of a priority of the request. One result of such a system is that if a bearer request is received for a new, higher priority user, service, or application and no more bearers are available for allocation, the bearer request will be rejected. Plus, when allocating bearers on an 'as needed' basis, valuable time is consumed in setting the bearers up. In order to better assure uplink bearer availability to a higher priority user, service, or application, and to minimize any wait time before such a user may transmit on the uplink bearer, communication system 100 provides a bearer allocation scheme that provides for a priority-based allocation of a limited number of unicast uplink bearers, wherein a fixed number of bearers are allocated to a top priority 'N' users, or user devices (the number 'N' being up to a designer of communication system 100).

Figure 5:
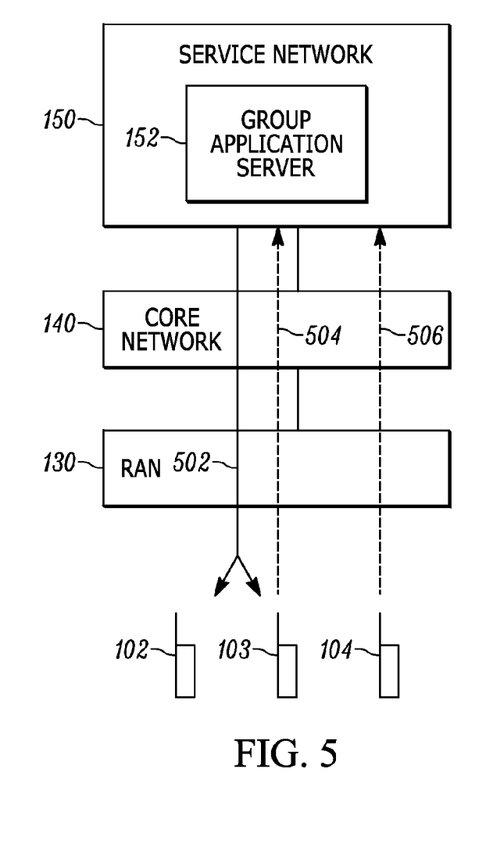
FIG. 5 is a block diagram depicting an exemplary establishment of unicast uplink bearers as part of a group call by the communication system of FIG. 1 in accordance with an embodiment of the present invention.
Figure 6:
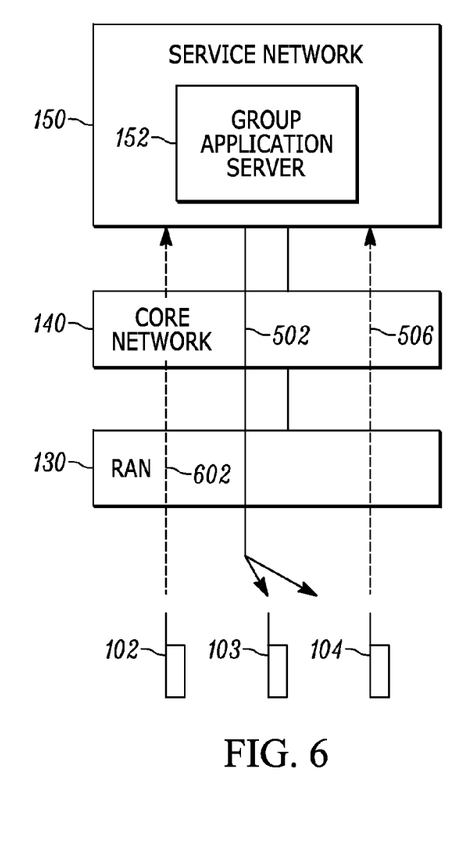
FIG. 6 is a block diagram depicting an exemplary establishment of unicast uplink bearers as part of a group call by the communication system of FIG. 1 in accordance with an embodiment of the present invention.

For example, and referring now to FIGS. 5 and 6, block diagrams are provided depicting an exemplary establishment of unicast uplink bearers as part of a group call by communication system 100 in accordance with an embodiment of the present invention. As depicted in FIG. 5, a downlink eMBMS bearer 502 and two unicast uplink bearers 504 and 506 are allocated to users, that is, user devices, of communication group 101. User device 104, as the current talker (the holder of the floor), is allocated a unicast uplink bearer 506, and user device 103, as the most recent talker, also is allocated a unicast uplink bearer 504. User device 102, as a non-recent talker, is not allocated a unicast uplink bearer. All user devices 102-104 use downlink eMBMS bearer 502, but as user device 104 is the current talker, user device 104 is not receiving on the downlink eMBMS bearer.

FIG. 6 then depicts a redistribution of unicast uplink bearers among the user devices of communication group 101 in response to a transfer of the floor from user device 104 to user device 102. Prior to being granted the floor, user device 102 was not allocated a unicast uplink bearer and, accordingly, needs to be allocated a unicast uplink bearer. Since user device 103 is the least recent talker between users device 103 and 104, the uplink bearer 504 allocated to user device 103 is de-allocated, that is, released, from the user device and a new unicast uplink bearer 602 is allocated to user device 102. New bearer 602 can be allocated to user device 102 because it uses wireless resources freed up when uplink bearer 504 was de-allocated from user device 103, thus no additional wireless resources are consumed by communication group 101. User device 104, as the most recent talker between user devices 103 and 104, retains its allocation of uplink bearer 506. And again, all user devices 102-104 use downlink eMBMS bearer 502, but as user device 102 is the current talker, user device 102 is not receiving on the downlink eMBMS bearer.

Figure 7A:
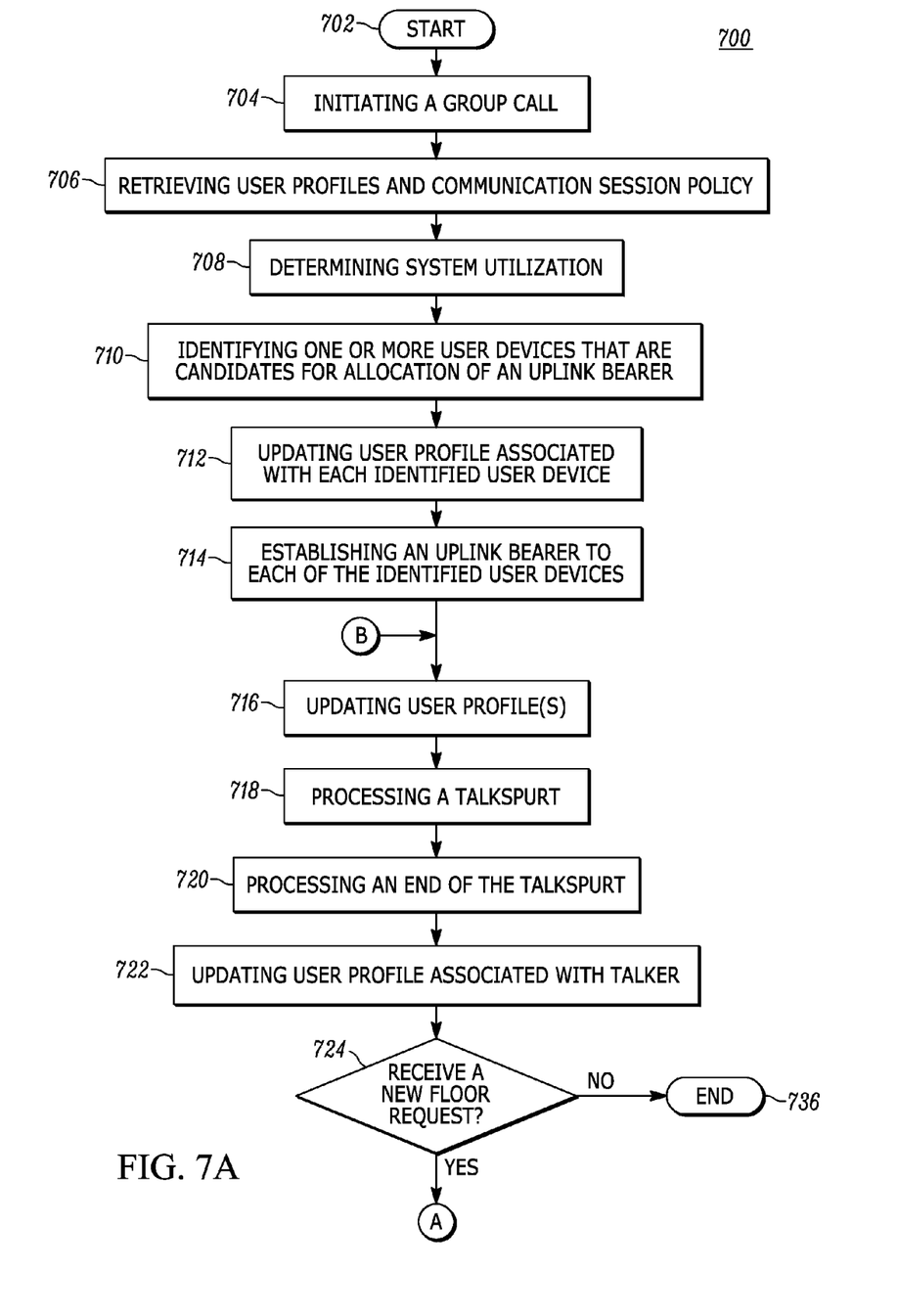
FIG. 7A is a logic flow diagram illustrating a method of bearer control performed by the communication system of FIG. 1 in accordance with various embodiments of the present invention.
Figure 7B:
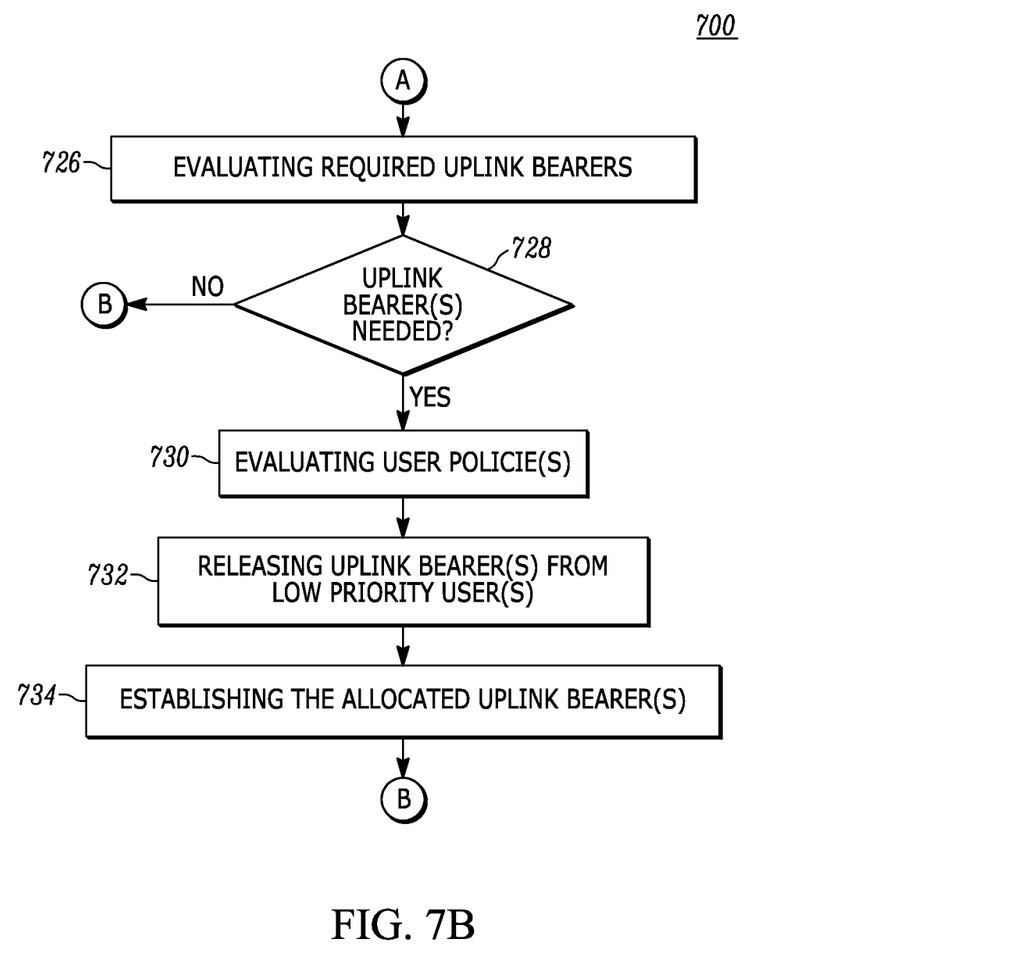
FIG. 7B is a continuation of the logic flow diagram of FIG. 7A illustrating a method of bearer control performed by the communication system of FIG. 1 in accordance with various embodiments of the present invention.

Referring now to FIGS. 7A and 7B, a logic flow diagram 700 is provided that illustrates a method of bearer control performed by communication system 100 in accordance with various embodiments of the present invention. Logic flow diagram 700 begins (702) when a service network element 152, such as a Group Application Server, in conjunction with a first user device that is a member of communication group 101, for example, user device 102, initiates (704) a group call for communication group 101. For example, the service network element may receive a floor request or a session initiation message, such as a Session Initiation Protocol (SIP) Invite, from user device 102, requesting to initiate a group call involving communication group 101.

In response to receiving the request, the service network element invites the other members of communication group 101, that is, user devices 103-107, to participate in the group call. In one embodiment, the service network element then receives a response from each user device agreeing to participate in the call, such as a 200 OK message. In other embodiments, no such response may be required. Regardless, it is assumed herein, for purposes of illustrating the principles of the present invention, that each of the user devices 102-107 is participating in the call. Further, in response to receiving the request, the service network element retrieves (706), from policy database 156, a policy associated with the group call, such as a quality of service (QoS) level required, or desired, for the group call. The service network element also retrieves, from one or more of user profile database 406 and policy database 156, a profile associated with each user device that is a member of communication group 101 and that is participating in the group call. In addition, the service network element determines (708), for example, by reference to system utilization database 154, a level of system utilization, such as an availability of wireless resources at each access node serving a participating user device, a number of participating user devices at a location, such as in a given cell and/or serviced by a given access node, and an availability of backhaul resources from such access node to the service network element.

The service network element allocates a downlink evolved Multimedia Broadcast Multicast Service (eMBMS) bearer for the group call. In other embodiments, the service network element may allocate one or more downlink unicast bearers to the user devices participating in the group call. Further, based on the determined level of system utilization and a number of user devices participating in the group call, the service network element establishes multiple unicast uplink bearers for the group call. That is, it is likely that, at any given time, fewer than all user devices participating in group call will be transmitting on an uplink bearer. Therefore, it would be wasteful to establish a unicast uplink bearer for each user device participating in group call. On the other hand, merely establishing unicast uplink bearers for user device only when they request to transmit may result in unacceptable transmission delays in emergency situations. Accordingly, communication system 100, and in particular the service network element, allocates, for the group call and based on the number of unicast uplink bearers available, a number of uplink bearers that is fewer than the number of user device participating in the group call and/or cumulative service and application clients 206 running on those user devices. Communication system 100, and in particular the service network element, then establishes unicast uplink bearers, and may later de-allocate one or more such bearers and correspondingly establish new unicast uplink bearers, among the user devices based on the user profiles associated with the user devices.

The service network element then identifies (710), based on a profile associated with each user device 102-107 participating in the group call and/or by reference to policy database 156, which user devices are candidates for establishment of a unicast uplink bearer and/or which applications and/or services running on those user devices are candidates for allocation of a unicast uplink bearer. The service network element then updates (712) the user profile associated with each identified user device to indicate that the user/user device has been allocated an uplink bearer and establishes (714) a unicast uplink bearers between the identified user device and the service network element.

That is, in response to determining system utilization, the service network element establishes multiple unicast uplink bearers for communication group 101 to produce multiple established unicast uplink bearers. In order to optimize a capacity of communication system 100, the number of unicast uplink bearers established for communication group 101 is fewer than the number of participating user devices in the group call and/or the cumulative number of services and applications running on the participating user devices. For example and merely for the purpose of illustrating the principles of the present invention, suppose that four unicast uplink bearers have been established for communication group 101, whereas six user devices, that is, user devices 102-107, are participating in the group call. As there are fewer unicast uplink bearers established for communication group 101 than there are user devices participating in the group call, the service network element identifies, by reference to the user profiles maintained in user profile database 406 and/or policy database 156, one or more user devices, for example, user devices 102-105, of the multiple participating user devices 102-107 that are candidates for establishment of a unicast uplink bearer. As noted above, each profile includes, for example, a location of the user device, a time period that has expired since the user device has most recently transmitted on an uplink bearer, a role of a user such as an employment area, title, or responsibility, associated with the user device, a relationship between the user and one or more other participants in the group call, and any other prioritization of one user and/or user device over another user/user device. The service network element then establishes a unicast uplink bearer to each of the identified participating user devices 102-105 for the group call.

For example, a determination of a location, such as a cell or an access node serving the user device, may be used to determine a number of user devices that are participating in the group call and served at the same cell or access node. Further, based on the determined location, a determination may be made of an availability of radio frequency (RF) resources at that cell or access node and correspondingly a number of unicast uplink bearers that may be established for user devices participating in the group call at that cell or access node. One may note that the number of user devices that may have an established unicast uplink bearer at a given cell/access node need not be fixed and may vary over the duration of the group call and/or between group calls.

In another example, the user devices that have most recently transmitted on an uplink bearer as part of a group call involving communication group 101 have a higher priority for allocation of a reserved uplink bearer than user devices that have less recently transmitted on an uplink bearer as part of a group call involving the communication group.

By way of yet another example, user devices associated with a user who has a more important role, with respect to an incident, have a higher priority for allocation of a reserved uplink bearer than user devices associated with users that have a less important role. For example, tactical units may have a higher priority than beat police, control center responders may have a higher priority than a responder on the street, a specialist, such as a hazardous material responder, may have a higher priority than a non-specialized responder, or military personnel may have a higher priority than civilian officials (or vice versa, depending on the incident).

In yet another example, a relationship between a user and one or more other participants in the group call may be considered in selecting who is allocated a reserved uplink bearer. That is, a user device associated with a user who has a more elevated, or important, role, such as a higher public safety position, among the responders to an incident may have a higher priority for allocation of a reserved uplink bearer than user devices associated with another responder. For example, a fire/police sergeant may be prioritized over a non-officer, a fire/police lieutenant may be prioritized over a fire/police sergeant, a fire/police battalion commander may be prioritized over a fire/police lieutenant, a high ranking city official may be prioritized over a fire/police commander, and so on.

When the service network element receives a transmission, such as a talkspurt, from a user device allocated a unicast uplink bearer, for example, user device 102, the service network element updates (716) the user profile associated with that user device, for example, in one or more of user profile database 406 and policy database 156, to reflect a time that the user device has just transmitted on an uplink bearer. Further, the service network element processes (718) the transmission. That is, the service network element receives the talkspurt from the first user device 102 via a unicast uplink bearer established with the user device and routes the talkspurt to the other participants in the group call, for example, via the allocated downlink eMBMS bearer and/or allocated downlink unicast bearers.

When the service network element detects (720) an end to the transmission by user device 102, the service network element again updates (722) the user profile associated with that user device, for example, in one or more of user profile database 406 and policy database 156, to reflect a time that the user device has stopped transmitting on the uplink bearer.

The service network element then determines (724) whether another request to transmit has been received. For example, the service network element may receive a request to transmit, for example, a floor request, from a participating user device 102-107, or the service network element may receive a request to transmit with respect to a service or application running on one of participating user devices 102-107.

If no further request to transmit is received, for example, if the group call is ended, then logic flow diagram 700 ends (736). In various other embodiments, the group call may end through an explicit 'end' message or through the expiration of a timer, or through any other means known in the art. However, if another request to transmit is received, then the service network element evaluates (726) what unicast uplink bearers are required to service the request and determines, by reference to a user profile associated with the requesting user device and maintained in one or more of user profile database 406 and policy database 156, whether the received request triggers (728) a unicast uplink bearer reallocation—that is, a deallocation of a unicast uplink bearer and an establishment of a new unicast uplink bearer for communication group 101. For example, the user profile would indicate whether the requesting user device currently has an established unicast uplink bearer or needs a unicast uplink bearer. One may note that even if the request to transmit is received from a user device that currently has an established unicast uplink bearer, unicast uplink bearers for all other group members can be re-evaluated in the background (such as the establishment of a unicast uplink bearer for, or the removal of a unicast uplink bearer from, such other group members). When multiple requests to transmit are received, the service network element may grant a request to transmit to a highest priority user based on the user profile associated with the requesting user devices.

If a reallocation is not triggered, that is, when the requesting participating user device and/or a requesting service or application at the requesting participating user device (and granted the right to transmit) currently has an established unicast uplink bearer, such as user device 103 and/or a service or application running on user devices 102-105, then logic flow diagram 700 returns to step 716. That is, the service network element receives a transmission, such as a talkspurt, from the requesting user device via its allocated unicast uplink bearer, updates the user profile associated with that user device, for example, in one or more of user profile database 406 and policy database 156, to reflect a time that the user device has just transmitted on its unicast uplink bearer, processes the transmission, detects an end to the transmission, and again updates the user profile associated with that user device to reflect a time that the user device has stopped transmitting on the uplink bearer.

If the requesting participating user device, for example, user device 107 and/or the requesting service or application at the requesting user device (and granted the right to transmit), does not currently have an established unicast uplink bearer, then the service network element determines (728) that a reallocation has been triggered and that the requesting user device is a candidate for establishment of a new unicast uplink bearer.

In response to determining that that a reallocation has been triggered, the service network element then evaluates (730) user policies associated with participating user devices currently having established unicast uplink bearers, that is, user devices 102-105, and/or services or applications running on those user devices and currently having established unicast uplink bearers. Based on the user profile evaluations, the service network element identifies one or more participating user devices that are candidates for de-allocation, that is, release, of a unicast uplink bearer. In identifying the one or more participating user devices that are candidates for de-allocation, the service network element considers the profiles associated with each such user device/service/application, which profile(s) are retrieved by the service network element from user profile database 406 and/or policy database 156. The identified user device/service/application preferably is a user device/service/application, from among the user devices/services/applications having an established a unicast uplink bearer, that has a lowest priority based on the parameters maintained in user profile database 406 and/or policy database 156. For example, when a participating user device has multiple established unicast uplink bearers, each associated with a different service or application, the service network element, by reference to policy database 156 or by detecting a QoS of an associated data flow, may de-allocate a bearer associated with a lowest priority service or application.

The service network element then de-allocates a unicast uplink bearer associated with the identified participating user device, such as participating user device 105 or to a service or application at the identified participating user device. That is, the service network element de-allocates (732), that is, releases or tears down, the unicast uplink bearer at the identified participating user device and establishes (734) a new unicast uplink bearer at the requesting participating user device, that is, user device 107, or the service or application requesting to transmit at the requesting user device. Logic flow diagram then returns to step 716. That is, the service network element receives a transmission, such as a talkspurt, from the requesting participating user device/service/application via the newly established unicast uplink bearer, updates the user profile associated with that user device, for example, in one or more of user profile database 406 and policy database 156, to reflect a time that the user device/service/application has just transmitted on its uplink bearer, processes the transmission, detects an end to the transmission, and again updates the user profile associated with that user device to reflect a time that the user device/service/application has stopped transmitting on its uplink bearer In another embodiment of the present invention, the service network element further may delay permission for a user of user device 107 to speak while the bearer allocated to user device 107 is being established, for example, by delaying a conveyance of a talk permit tone to the user device or by conveying an extended talk permit tone to the user device.

By establishing and de-allocating a limited number of unicast uplink bearers to user devices based on who is most likely to transmit or is highest in priority, transmission delays that may result when such bearers are allocated and set up merely in response to a request to transmit is reduced. Further, a capacity of communication system 100 is conserved by utilizing a number of uplink unicast bearers that is fewer than the number of user device participating in the group call based on the user profiles associated with the user devices. Also, by implementing a per-user function that, in response to receiving a new bearer request associated with a user device, can free up RF bandwidth currently allocated to other user devices, communication system 100 better assures that provision of higher priority services or applications by, or to, the user device, such as emergency responder services, will not be blocked by lower priority users, services, or applications.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for bearer control in a group call, the method comprising:
    allocating a plurality of uplink bearers to a plurality of user devices participating in the group call, wherein the plurality of participating user devices allocated uplink bearers are fewer than all of the participating user devices;
    receiving a trigger to reevaluate the plurality of uplink bearers currently allocated for the group call;
    identifying, based on a profile associated with each user device of the plurality of participating user devices currently participating in the group call, a currently participating user device, of the plurality of currently participating user devices currently allocated uplink bearers, as a candidate for de-allocation of a currently used uplink bearer, wherein the participating user device identified as the candidate for de-allocation of an uplink bearer is different than the participating user device most recently holding a floor of the group call and has been identified as a least recent talker among a plurality of devices;
    identifying, based on a profile associated with each user device of a plurality of user devices currently participating in the group call, a currently participating user device of the plurality of currently participating user devices that is a candidate for establishment of an uplink bearer;
    releasing a currently used uplink bearer, of the plurality of uplink bearers, allocated to the currently participating user device identified as the candidate for de-allocation of an uplink bearer;
    establishing an uplink bearer for the currently participating user device, of the plurality of participating user devices, identified as the candidate for establishment of an uplink bearer;
    wherein receiving a trigger to reevaluate uplink bearers comprises receiving a floor request for the group call; and
    wherein establishing an uplink bearer for one or more participating user devices of the plurality of participating user devices identified as candidates for establishment of uplink bearers comprises establishing an uplink bearer for the participating user device requesting the floor, and wherein the method further comprises:
    delaying permission for the user of the participating user device requesting the floor to speak while the bearer is being established.

2. The method of claim 1, wherein receiving a trigger to reevaluate uplink bearers comprises receiving a request to start a new call.

3. The method of claim 1, wherein the floor request is received from a currently participating user device of the plurality of participating user devices and wherein receiving a trigger to reevaluate uplink bearers further comprises:
    determining that the currently participating user device requesting the floor requires an uplink bearer; and
    determining that the currently participating user device requesting the floor does not currently have an established uplink bearer.

4. The method of claim 1, wherein identifying the participating user device, of the plurality of participating user devices allocated uplink bearers, as the candidate for de-allocation of the uplink bearer comprises identifying the participating user device as the candidate for de-allocation of the uplink bearer based on one or more of: a time period that has expired since the user device has most recently transmitted on an uplink bearer;
    a role of a user associated with the user device;
    a priority of a user associated with the user device;
    a location of the user device; and
    a relationship between the user and one or more other participants in the group call.

5. The method of claim 1, further comprising:
    in response to establishing an uplink bearer for the participating user device of the plurality of participating user devices identified as the candidate for establishment of an uplink bearer, updating a profile associated with the participating user device for which an uplink bearer is established.

6. The method of claim 1, further comprising:
    updating a profile associated with the participating user device whose uplink bearer was de-allocated.

7. A service network element capable of bearer control in a group call, the service network element comprising:
    a processor that is configured to:
    allocate a plurality of uplink bearers to a plurality of user devices participating in the group call, wherein the plurality of participating user devices allocated uplink bearers are fewer than all of the participating user devices;
    receive a trigger to reevaluate the plurality of uplink bearers allocated for the group call;
    identify, based on a profile associated with each user device of the plurality of currently participating user devices participating in the group call, a participating user device, of the plurality of participating user devices allocated uplink bearers, as a candidate for de-allocation of an uplink bearer, wherein the currently participating user device identified as the candidate for de-allocation of an uplink bearer is different than the participating user device holding a floor of the group call, and has been identified as a least recent talker among a plurality of devices;

identify, based on a profile associated with each user device of a plurality of user devices participating in the group call, a currently participating user device of the plurality of currently participating user devices that is a candidate for establishment of an uplink bearer;

release an currently used uplink bearer, of the plurality of uplink bearers, allocated to the currently participating user device identified as the candidate for de-allocation of an uplink bearer;

establish an uplink bearer for the currently participating user device, of the plurality of participating user devices, identified as the candidate for establishment of an uplink bearer;

wherein the processor is configured to receive a trigger to reevaluate uplink bearers by receiving a floor request for the group call and wherein the processor is configured to establish an uplink bearer for one or more participating user devices of the plurality of participating user devices identified as candidates for establishment of uplink bearers by establishing an uplink bearer for the participating user device requesting the floor, and wherein the processor further is configured to:

delay permission for the user of the participating user device requesting the floor to speak while the bearer is being established.

8. The service network element of claim 7, wherein the processor is configured to receive a trigger to reevaluate uplink bearers by receiving a request to start a new call.

9. The service network element of claim 7, wherein the floor request is received from a participating user device of the plurality of participating user devices and wherein the processor is configured to trigger a reallocation of uplink bearers by:

determining that the participating user device requesting the floor requires an uplink bearer; and determining that the participating user device requesting the floor does not currently have an established uplink bearer.

10. The service network element of claim 7, wherein the processor is configured to identify the participating user device, of the plurality of participating user devices allocated uplink bearers, as the candidate for de-allocation of the uplink bearer by identifying the participating user device as the candidate for de-allocation of the uplink bearer based on one or more of:

a time period that has expired since the user device has most recently transmitted on an uplink bearer;

a role of a user associated with the user device;

a priority of a user associated with the user device;

a location of the user device; and a relationship between the user and one or more other participants in the group call.

11. The service network element of claim 7, wherein the processor further is configured to:

in response to establishing an uplink bearer for the participating user device of the plurality of participating user devices identified as the candidate for establishment of an uplink bearer, update a profile associated with the participating user device for which an uplink bearer is established.

12. The service network element of claim 7, wherein the processor further is configured to:

update a profile associated with the participating user device whose uplink bearer was de-allocated.

13. The service network element of claim 7, wherein the service network element is a Group Application Server.

* * * * *